Nov. 29, 1949 T. R. REAHARD 2,489,930
TRASH CHOPPER FOR PLOWS
Filed Sept. 5, 1947

INVENTOR.
Thomas R. Reahard
BY *Owen & Owen*
ATTORNEYS

Patented Nov. 29, 1949

2,489,930

UNITED STATES PATENT OFFICE 2,489,930

TRASH CHOPPER FOR PLOWS

Thomas Rex Reahard, North Manchester, Ind.

Application September 5, 1947, Serial No. 772,314

5 Claims. (Cl. 97—194)

This invention relates particularly to an attachment for coulters used in connection with plows whereby weeds, long grass, long stubbles or other trash in advance of the plow coulter during plowing operations may be flattened on the ground and cut in short lengths in advance of the plow, thus adapting them to be plowed entirely under instead of projecting from the furrows above the plowed ground.

The object of the invention is the provision of a simple and effective means of this nature that is capable of being easily attached to a coulter or bracket adjacent thereto and which includes a cutter or chopper member that is operable, by movement of the device over the ground, to have a reciprocatory cutting action to cut into relatively short length material over which it passes and prevent the objectionable accumulation of such material in front of the coulter disk.

Further objects and advantages of the invention are set forth in the following detailed description, and a preferred embodiment thereof is shown in the accompanying drawings, in which—

Figure 1:
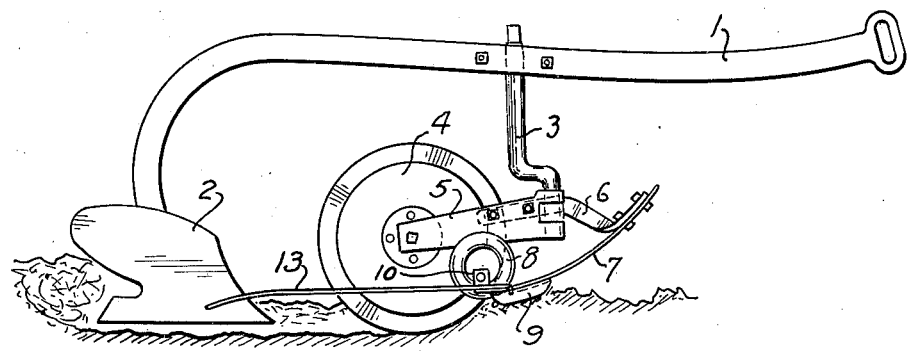
Figure 2:
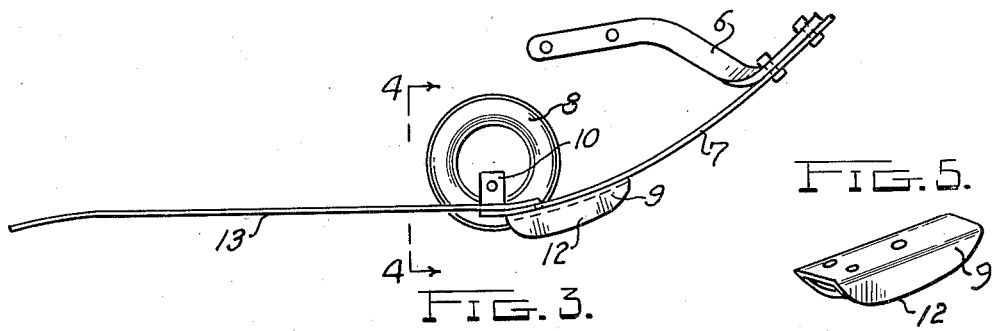
Figure 5:
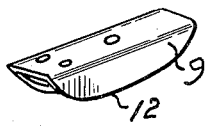
Figure 3:
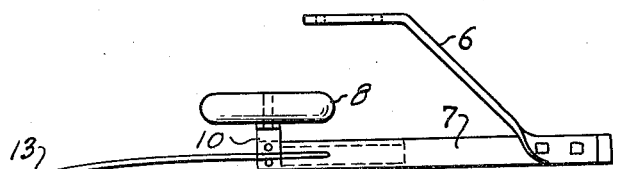
Figure 4:
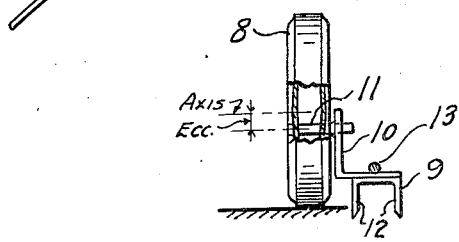

Fig. 1 is a side elevation of a plow with coulter attachment in operative engagement with the soil and equipped with a trash chopping device embodying the invention; Fig. 2 is an enlarged side elevation of the trash chopper removed from the plow; Fig. 3 is a top plan view thereof; Fig. 4 is an enlarged rear end view thereof with a part broken away and a part in section, and Fig. 5 is a perspective view of the trash chopping element removed from its carrying member.

Referring to the drawings, 1 designates a plow beam with a plow 2 at its rear end, and 3 a bracket arm projecting direct from the beam and from which the customary coulter disk 4 trails. In the present instance, the coulter carrying fork 5 is swingingly connected to the bracket arm 3.

The attachment embodying the invention comprises a bracket arm 6 fixed to a side of and projecting forward from the coulter fork 5 in advance of the bracket arm 3, a spring arm or bar 7 fixedly attached at its forward end to and trailing rearwardly from the free or forward end of the arm 6, a supporting wheel 8 for the rear end of the bar 7, and a chopper member 9 fixedly attached to the under side of the bar 7 at its free or trailing end and serving as a runner for riding on the ground surface and over material thereon to be cut.

The arm 6, in the present instance, is attached to the coulter fork 5 at the unplowed land side thereof and extends forward therefrom and then across in advance of the bracket arm 6 so that the bar attaching end thereof is in advance of the mold board side of the plow. The spring bar 7, supporting the wheel 8 and cutter 9, are thus on the same side of the coulter as and in advance of said mold board, so that the cutter, in traveling over the ground, tends to lay the weeds, stubble and other trash over on the surface of the land that is next to be turned by the mold board of the plow.

An angle bracket 10 is fixed to the free or rear end of the spring bar 7 with one arm extending upwardly from its inner side and to this arm is fixed a horizontally projecting stud or axle 11 on which the wheel 8 is mounted for free turning movements. This axle is disposed eccentrically to the wheel axis so that the free end of the bar 7 and the cutter 9 carried thereby are caused to be vertically reciprocated as the wheel rolls over the ground. This action of the cutter not only beats the grass, weeds and other trash down as the cutter passes over it, but also causes it to be cut or chopped into comparatively short lengths preparatory to being turned under by the plow. In the present instance, the cutter has two transversely spaced lengthwise extending blades 12 to facilitate the cutting action.

The wheel 8 is preferably provided with a rubber tire so that it will have more traction on the ground to cause it to turn rather than to slip in contact with the ground. The spring action of the bar 7 tends to hold the wheel to the surface over which it is passing. The wheel 8 is disposed adjacent to the furrow side of the coulter with its forward edge preferably projecting slightly in advance of the front edge of the coulter disk 4 at its point of bite into the soil, and this position of the wheel, together with the position of the cutter 9, prevents the objectionable building up of weeds, grass or other trash in advance of the coulter disk, which latter is an objectionable feature in the operation of a plow. The cutting-up of such loose material by the cutter 9 performs an important part in preventing this.

A guard finger 13 preferably extends rearwardly from the rear end of the bar 7 and bends gradually outward away from the line of travel of the wheel 8 and serves to bend weeds or tall stubbles over on the ground in position to be turned under with the next furrow cut.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. The combination with a plow coulter of a downwardly pressed spring bar at the side of the coulter adjacent to its front edge, and a trash cutter carried by the bar at its under side and pressed thereby against the surface over which traveling and at a side and in advance of the coulter to cut reclining weeds, stubbles or the like on such surface.

2. The combination with a plow coulter, of a downwardly pressed spring bar at a side of the coulter adjacent to its front edge, a trash cutter carried by the bar and pressed thereby against the surface over which traveling to cut reclining stubbles or the like on said surface, said cutter being in advance of the coulter, and a wheel for traveling on the surface at a side of the coulter and forming an eccentric support for the free end portion of the spring bar whereby a turning of the wheel causes the bar and cutter to be vertically reciprocated.

3. The combination with a plow coulter, of a spring bar trailing at a side thereof from a point in advance and riding on and normally pressing down toward the surface over which passing, a wheel carried by the free end portion of the bar at a side of the coulter adjacent thereto with its forward edge projecting slightly forward of the coulter so as to pass over and press to said surface loose material with which the front edge of the coulter comes in contact, and a trash cutter carried by said bar at its under side adjacent to said wheel for cutting reclining weeds, stubbles, or the like, on the surface over which it passes.

4. The combination with a plow coulter, of a spring bar trailing at a side thereof from a point in advance and riding on and normally pressing down toward the surface over which passing, a wheel carried by the free end portion of the bar at a side of the coulter adjacent thereto with its forward edge projecting slightly forward of the coulter so as to pass over and press to said surface loose material with which the front edge of the coulter comes in contact, and a trash cutter carried by said bar at its under side adjacent to said wheel for cutting reclining weeds, stubbles, or the like, on the surface over which it passes, said wheel having an eccentric mount on the bar whereby a rotation of the wheel imparts vertical reciprocatory movements to the cutting means.

5. A plow coulter attachment comprising a bracket arm for attaching to the coulter mount for horizontal turning movements therewith and projecting forward thereof, a spring bar for trailing rearwardly from said arm at the side of the coulter and exerting a downward pressure on the surface over which passing, a wheel support for the rear end portion of said bar positioned to be disposed at a side of the forward edge portion of a coulter when attached thereto, said wheel having an eccentric mount on the bar to impart vertical reciprocatory movements to the bar when the wheel is rolling over a supporting surface, and a brush cutter carried by the rear end portion of the bar at its under side to sever loose material over which it may pass, said cutter having a plurality of downwardly projecting forwardly and rearwardly extending cutter blades.

THOMAS REX REAHARD.

REFERENCES CITED

The following references are of record in the file of this patent:

UNITED STATES PATENTS

| Number | Name | Date |
| --- | --- | --- |
| 918,445 | Gundholm | Apr. 13, 1909 |
| 1,030,759 | Allen | June 25, 1912 |
| 1,261,150 | Mountjoy | Apr. 2, 1918 |
| 1,762,258 | Chenoweth et al. | June 10, 1930 |